United States Patent [19]

Stoll et al.

[11] Patent Number: 5,171,025

[45] Date of Patent: Dec. 15, 1992

[54] SEALING ARRANGEMENT FOR A VALVE AND MORE PARTICULARLY ONE IN THE FORM OF A MULTI-WAY VALVE

[75] Inventors: Kurt Stoll; Manfred Rüdle, both of Esslingen, Fed. Rep. of Germany

[73] Assignee: Festo KG, Esslingen, Fed. Rep. of Germany

[21] Appl. No.: 750,500

[22] Filed: Aug. 27, 1991

[30] Foreign Application Priority Data

Aug. 31, 1990 [DE] Fed. Rep. of Germany ....... 4027520
Jul. 25, 1991 [EP] European Pat. Off. ........ 91112475.8
Aug. 5, 1991 [EP] European Pat. Off. ........ 91113126.6

[51] Int. Cl.$^5$ ............................................. F16J 15/32
[52] U.S. Cl. ..................... 277/35; 137/248; 137/625.66; 251/214; 277/152; 277/167.5; 277/168; 277/189
[58] Field of Search ......... 277/35, 44, 47–51, 277/152, 167.3, 167.5, 168, 170, 171, 173, 174, 176, 177, 193–195, 199, 181, 185, 186, 189, 189.5; 137/248, 249, 384, 625.66; 251/214

[56] References Cited

U.S. PATENT DOCUMENTS

| | | | |
|---|---|---|---|
| 386,198 | 7/1888 | Halford et al. | 277/193 |
| 785,137 | 3/1905 | Westbrook . | |
| 2,191,873 | 2/1940 | Victor . | |
| 2,257,119 | 9/1941 | Johannesen | 277/152 X |
| 2,367,411 | 1/1945 | Lillis | 277/35 |
| 2,368,744 | 2/1945 | Carey | 277/171 X |
| 2,438,153 | 3/1948 | Dick | 277/171 X |
| 2,690,360 | 9/1954 | Young | 277/169 X |
| 2,770,510 | 11/1956 | Collins | 277/171 X |
| 2,799,523 | 7/1957 | Parker | 277/170 X |
| 2,889,183 | 6/1959 | Peras | 277/169 |
| 2,892,644 | 6/1959 | Collins | 277/171 |
| 2,938,704 | 4/1957 | Quail . | |
| 3,089,678 | 5/1963 | Grove | 277/169 X |
| 3,275,334 | 9/1966 | Voitik . | |
| 3,338,584 | 8/1967 | Nakanishi et al. | 277/186 X |
| 3,663,024 | 5/1972 | Traub . | |
| 3,909,017 | 9/1975 | Engström | 277/171 X |
| 3,926,444 | 12/1975 | Gripe et al. | 277/177 |
| 3,951,166 | 4/1976 | Whitener . | |
| 3,968,971 | 7/1976 | Mariaulle | 277/177 |
| 3,990,711 | 11/1976 | Hill | 277/181 X |
| 4,039,197 | 8/1977 | Schmidt et al. | 277/48 X |
| 4,240,467 | 12/1980 | Blatt et al. | 277/177 X |
| 4,371,178 | 2/1983 | Ott | 277/193 X |
| 4,415,166 | 11/1983 | Beia | 277/152 X |
| 4,566,703 | 1/1986 | Zitting . | |

FOREIGN PATENT DOCUMENTS

| | | |
|---|---|---|
| 133581 | 1/1979 | Fed. Rep. of Germany . |
| 3149306 | 6/1983 | Fed. Rep. of Germany . |
| 3408182 | 9/1985 | Fed. Rep. of Germany . |
| 2314411 | 1/1977 | France . |
| 55-36602 | 3/1980 | Japan . |
| 600202 | 6/1978 | Switzerland . |
| 1190119 | 11/1985 | U.S.S.R. ............... 277/152 |

*Primary Examiner*—William A. Cuchlinski, Jr.
*Assistant Examiner*—Scott W. Cummings
*Attorney, Agent, or Firm*—Hoffmann & Baron

[57] ABSTRACT

A sealing arrangement for valve has at least one sealing ring, which has a substantially U-like cross section of its housing ring, which is made up of a plurality of parts which are permanently connected together. In the ring space of the housing ring a single, integral sealing element is mounted so as to be able to yield radially and with the housing ring it constitutes a component which may be uniformly handled. A sealing part thereof extends out of the housing opening of the ring space. A sealing ring of this type may be locked in valve housings in order to provide a sealing action between the valve housing and the moving valve piston. The design of the sealing rings makes them suitable for robotized assembly.

18 Claims, 1 Drawing Sheet

SEALING ARRANGEMENT FOR A VALVE AND MORE PARTICULARLY ONE IN THE FORM OF A MULTI-WAY VALVE

The invention relates to a seal arrangement for a valve and more particularly for a multi-way valve, and for providing a sealing action between an axially moving valve piston and a valve housing, comprising at least one annular seal unit, which has an annular seal element held between two axially spaced annular walls.

A seal arrangement of this type is described in the French patent 2,314,411. It comprises a plurality of identical sealing units, which respectively consist of two separate ring disks, between which sealing elements are held in radial succession. Since accordingly each sealing element consists of a plurality of loose parts, which are only locked in relation to each other in the valve housing after assembly has been completed, the manipulation and fitting thereof is comparatively complex. Since the ring disks are, in the assembled condition, only able to bear along a narrow edge on the valve housing, they are furthermore not steadily held in position. Furthermore, the two ring disks of a respective sealing unit may by mistake be thrust together so forcefully during assembly that the function of the inserted sealing elements is impaired.

SHORT SUMMARY OF THE PRESENT INVENTION

Accordingly one object of the invention is to provide a sealing arrangement of the type initially mentioned in the case of which there is the combination of a low-price design and a reliable sealing action together with the possibility of simply robotized assembly.

A still further object of the present invention is to provide such a sealing arrangement suitable for fitting without danger of damage to the sealing elements while simplifying fitting to a valve.

In order to achieve these and/or other objects appearing from the present specification, claims and figures, the two walls are part of a multi-part, fixedly connected housing ring, which has an essentially U-like cross section with a radially directed and circumferentially extending housing opening, in the annular space between the two axial walls of the housing ring a single, integral sealing element is fixed in a radially yielding manner so that the sealing unit is constituted by a sealing ring, which is able to be handled uniformly as a component and includes the housing ring and the sealing element, the sealing element as seen in cross section has a radially extending annular sealing lip, whose one sealing part extends through the opening of the housing out of the ring space and projects radially past the housing ring and the section, which is within the ring space, of the sealing lip is axially flanked by the sections which act as support parts, of the two walls, and the sealing element has at least one axially projecting circumferentially extending retainer spur, which hooks onto a step of the housing constituted by the housing ring within the annular space in order to permanently retain the sealing element.

The sealing arrangement in accordance with the invention renders possible a separate production of the sealing units independently from the part to be sealed as a uniformly or consistently manipulatable component in the form of a sealing ring. The multi-part design makes possible simple insertion of the sealing element into the ring space in the housing ring before permanently connecting the parts. Since only one single sealing element is present reliable function of the sealing ring is guaranteed. The support parts, arranged on the two sides of the sealing lip, of the housing ring make possible the use of comparatively soft sealing materials, since the sealing lip is protected thereby against lateral bending and kinking. The cooperation of a retainer spur with a step on the housing in the annular space prevents the sealing element from dropping out even when under heavy loads. All in all the resulting structure is well adapted for robotized assembly, this leading to automated fitting both of the sealing rings and also of the valve having such sealing rings. The sealing rings are able to be universally used and in accordance with the selected radial alignment of the housing opening one may have an internally or an externally sealing seal ring. As a material for the integral sealing element it is preferred to use an elastic synthetic resin material such Perbunan or a polyurethane. The housing ring consists preferably of a metal, but it may consist of a synthetic resin material completely or in part, and in this case a high-strength polymer is preferably employed.

The U.S. Pat. No. 3,275,334 discloses a cartridge-like sealing arrangement. However, it consists of a plurality of sealing elements, which are thrust together by means of a spiral spring against the surface on which the sealing action is desired. Furthermore in this case it is a question of a sealing arrangement for rotary components, the housing of the sealing arrangement being stationary and the sealing elements producing a rotary action in relation to the same so that they slide along the sealing housing as part of such movement.

The Swiss patent 600,202 discloses a sealing arrangement, which also consists of a plurality of sealing elements. These parts are furthermore set in a radial groove in one of the parts between which the sealing action is desired so that individual assembly is necessary.

The U.S. Pat. No. 3,565,115 discloses a valve, in the case of which the sealing elements are combined together as cage-like structures.

Advantageous further feature of the instant invention are described in the claims.

The invention will now be described in more detail with reference to the accompanying drawings, which show several working embodiments thereof.

LIST OF THE SEVERAL VIEWS OF THE FIGURES

DETAILED ACCOUNT OF WORKING EMBODIMENTS OF THE INVENTION

Figure 1:
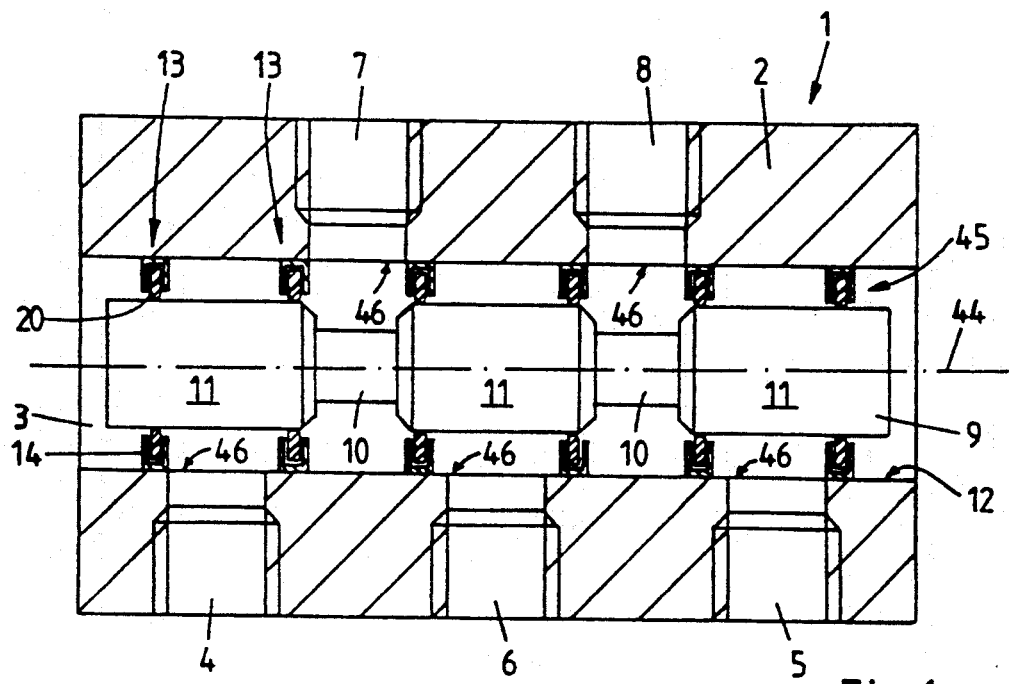
FIG. 1 shows diagrammatically the structure of a valve, which is provided with a plurality of sealing rings, in longitudinal section and omitting the actuating device necessary for the operation of the valve piston, the sealing rings being shown in a simplified form.

In FIG. 1 the reader will perceive a multi-way valve generally referenced 1 and in the form of a 5/3 way valve having a housing 2, which internally has an elongated valve housing recess 3. The latter functions to receive a valve spool or a valve piston, respectively 9 and it is either directly incorporated in the valve housing 1 or is constituted by some other part, for instance a sleeve, fixed to the housing. The valve housing recess 3 is accessible from at least one axial end since at least one terminal end section of the valve housing 2 is provided with a removable valve end cover, not illustrated in detail.

Laterally and circumferentially a plurality of valve ducts 4, 5, 6, 7 and 8 open into the valve housing recess 3. Externally they are connected in a conventional manner with a source of compressed air (at 6) and loads (at 7 and 8) and two further valve ducts 4 and 5 function to vent spent air.

The valve piston 9 is able to be reciprocated in the axial direction 44 within the valve housing recess 3. It preferably has a circular cross section which varies along the length thereof, since it has a plurality of axially alternating circumferentially extending recesses 10 and projecting parts or lands 11. Dependent on the particular position in the longitudinal direction some of the valve ducts present are connected with each other fluid powerwise and others are separated from each other.

In order to provide a sealing action between the wall 12 of the valve housing recess 3 and the valve piston 9 there is a sealing arrangement generally referenced 45, which consists of a plurality of sealing rings 13 which are spaced out from each other in the axial direction and are coaxially arranged in relation to each other. They each have a housing which in what follows is referred to as a housing ring 14, by means of which they are secured in relation to the housing immovably in the axial direction in the said valve housing recess 3. They are for this reason in a coaxial alignment between the wall 12 and the valve piston 9 which they surround with an annular sealing element 20 at the lands 11 without hindering the axial movement of the valve piston 9.

The sealing rings 13 constitute annular sealing units, which inside the valve housing recess 3 ensure axial separation between the individual sections of the recess, into which the valve ducts 4 through 8 open. Therefore one respective sealing ring 13 is positioned in the axial part between two axially succeeding valve duct openings or ports 46. The respectively last port 46 of the row of ports may be followed such a sealing ring 13 as a sealing means preventing loss of fluid power medium to the outside. It will be apparent that hence the number of sealing rings 13 present per valve will be dependent on the respective type of valve and the number of valve ducts present.

The sealing rings of the sealing arrangement are only diagrammatically illustrated in FIG. 1. Specific preferred working embodiments will be seen in FIGS. 2 and 3.

Figures 2, 3:
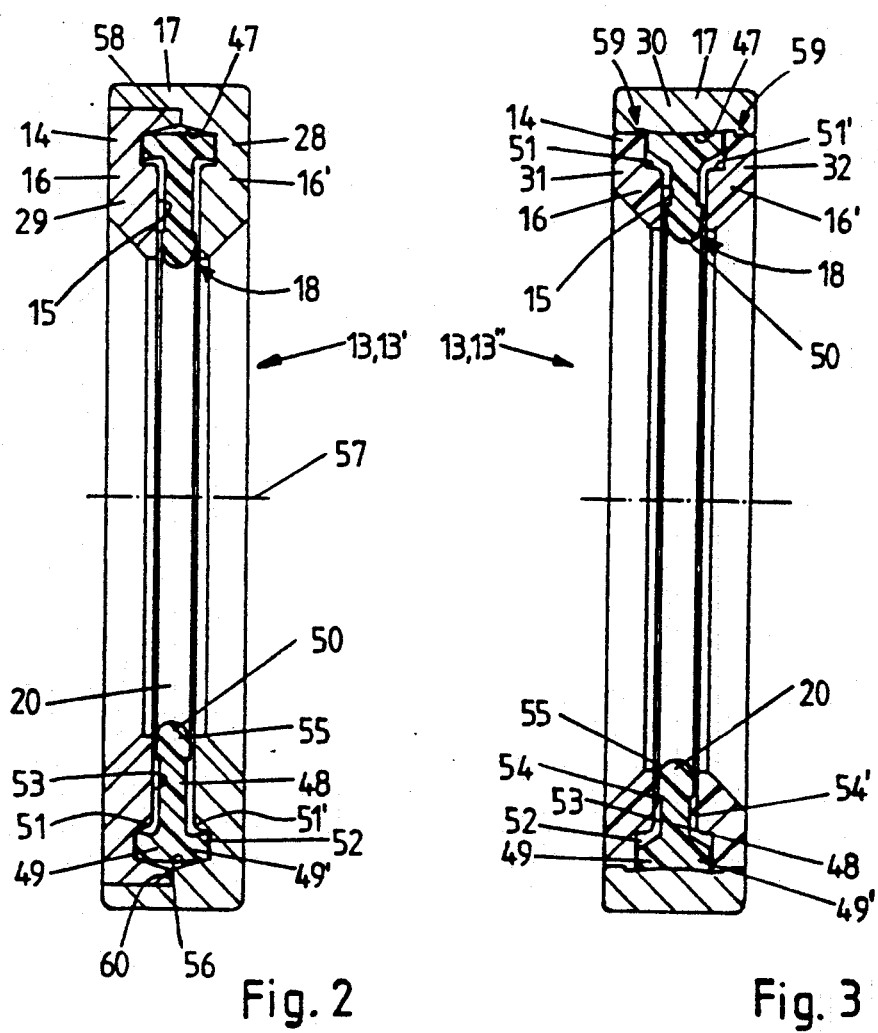
FIG. 2 and FIG. 3 show two possible modifications of the sealing ring in accordance with the invention, for instance to indicate how it may be incorporated in different forms in the valve in accordance with FIG. 1, respectively in cross section, that is to say in a section taken along a plane extending axially and radially.

The sealing rings 13, 13' and 13" illustrated in FIGS. 2 and 3 each have an annular sealing housing, which is referred to as a housing ring 14. It is of multi-part design and the individual parts are fixedly or permanently connected together so that the resulting cross section of the housing ring is essentially U-like. Therefore the housing ring 14 has a circumferentially extending ring space 15, which is delimited on three sides by the two ring parts 16 and 16', corresponding to the limbs of a letter U, and the ring part 17 corresponding to the transverse part of the letter U, while a radially directed circumferential housing opening 18 is left free.

In the ring space 15 of a respective sealing ring 13 there is a single, integral annular sealing element 20, which is coaxially arranged and secured so that it is able to yield in the radial direction. It is permanently held in the housing ring 14 so that the sealing ring consisting of this housing ring 14 and the sealing element 20 represents a uniform component that may be handled as single part.

By way of the housing ring 14 it is possible to lock a respective sealing ring 13 respectively on one of two relatively moving parts which are to be sealed in relation to each other. In the case of a valve 1 in accordance with FIG. 1 the fixing in position is preferably to the housing since the housing ring 14 has its radially outwardly directed ring section 17 locked to the wall 12, while the housing opening 18 is directed radially inwards towards the valve piston 9. The axial fixation in the valve housing recess 3 is possible in various different ways, in which respect a press-fit is preferred.

The sealing element 20 of the working embodiments is made up of sealing lip 48 and two retaining spurs 49 and 49' formed integrally with it. The sealing lip 48 extends, as seen in cross section, in the radial direction and generally has the configuration of a circular washer. One sealing part 50, which is constituted by its radially inwardly pointing peripheral edge, of the sealing lip 48 extends through the housing opening 18 out of the ring space 15 in such a manner that it projects radially inwards past the housing ring 14 or, respectively, its two ring parts 16 and 16'. The section, positioned within the ring space 15, of the sealing lip 48 is flanked by the sections, which act as support parts, of the two axial ring parts 16 and 16' so that the sealing lip 48 is prevented from kinking or bending over sideways, when the valve piston 9 encompassed by it is moved.

The two retainer spurs 49 and 49' are integrally molded on the circumferential edge, which is within the ring space 15, of the sealing lip 48, such spurs being directed in opposite axial directions from the sealing lip and they are opposite to each other axially. Therefore the sealing element 20 as seen in cross section generally has the configuration of a letter T. The retainer spurs 49 and 49' are circumferentially extending ring spurs, which respectively fit around or hook onto a housing step 51 and 51' formed by the housing ring 14 within the ring space 15. Therefore the sealing element 20 is fixed or anchored by the housing ring 14.

Preferably the two housing steps 51 and 51' are constituted by the transitional zone between an axially widened section 52 and a narrower, slot-like section 53 of the ring space 15, the slot-like section 53 merging at one end radially with the housing opening 18 and at the other end radially with the widened section 52. It is in this manner that therefore the ring space 15 as well preferably has a substantially T-like cross sectional form, which is quite suitable to receive the correspondingly shaped sealing element 20.

In the case of a further working embodiment, not illustrated, only one spur or projecting part is provided, while the presence of two retainer spurs ensures a better seating of the sealing element.

The axially measured breadth of the annular ring space 15 adjacent to the slot-like section 53, which constitutes the two supporting part 54 and 54', is preferably somewhat greater than the breadth of the sealing lip 48 in this zone so that the lip 48 has a small amount of room for axial movement, this being an advantage for the sealing function. Furthermore, the sealing lip 48 adjacent to the sealing part 50 preferably has a circumferentially extending thicker part 55, which extends a small distance into the slot-like section 53. Between the thicker part 55 and the retainer spurs 49 and 49' arranged on the opposite radial side there preferably remains a thinner sealing lip section, which, as seen in cross section, has the configuration of a neck, which provides an advantageous effect as regards deformation of the sealing element 20.

The sealing element 20 consists preferably of synthetic resin material with rubber-elastic properties. It is preferred for it to consist of rubber, Perbunan or a polyurethane.

An elastic adaptation of the cross section surrounded by the sealing part 50 to allow for inaccuracies in manufacture in the cross section of the valve piston 9 on which the sealing action is to take place, is enhanced if the floor 47, which is radially opposite to the housing opening 18, of the ring space 15 has a zone 56 which as seen in cross section is deeper than the axially adjacent zones. This zone 56 is preferably positioned adjacent to the axial center of the floor 47, as shown in FIG. 2. The area of the floor 47 is in this case grooved and the axial center part of the floor 47 is therefore at a greater distance from the longitudinal axis 57 of the sealing ring 13 than the axial edge zones of the floor 47.

The peripheral surface, adjacent to the floor 47, of the sealing element 20 is, on the other hand, preferably essentially cylindrically shaped in the normal condition. Therefore in a radial extension of the sealing lip 48 there is, between the sealing element 20 and the floor 47, a circumferential intermediate space 58 which becomes larger towards the center radially. The retainer spurs 49 and 49', which bear the outer circumferential surface of the sealing element 20, are in this respect so positioned that their outer edge parts adjoin the associated axial edge parts of the floor 47. If now during the introduction of one of the projecting parts 11 of the valve piston 9, a radial thrust is exerted on the sealing lip 11, the sealing element 20 will be able to deform in the radially central part axially outwards into the intermediate space 58. The retainer spurs 49 and 49' therefore in this case serve to attach the sealing lip 48 in a radially movable manner.

It is an advantage of the retainer spurs 49 and 49' are in axial engagement with the sections, which are facing them, of the widened section 52. It is also possible to make a provision here such that the sealing element 20 is clamped adjacent to retainer spurs 49 and 49' between two axially spaced sections of the housing ring 14.

If now a sealing ring 13 is mounted in a valve housing recess 3, it is possible for the sealing element 20 to cooperate with the sealing part 50 with a sealing action on a coaxially surrounding land 11, since it is subjected to a thrust on the its circumferential surface for sealing engagement. The sealing action between the housing ring 14 and the valve housing is preferably caused automatically by the fixed positioning of the housing ring 14, which is preferably coaxially press-fitted in the valve housing recess 3. A further sealing action is caused between the seal element 20 and the housing ring 14, it being more particularly the retainer spurs 49 and 49' and/or the thicker part 55 which are able enter into sealing cooperation with parts of the housing ring 14.

The housing ring 14 of the sealing rings 13 advantageously consists of a plurality of parts. FIG. 2 shows a two-part design and FIG. 3 a three-part one. In the case of the individual parts it is preferably a question of ring parts 28, 29, 30, 31 and 32 which are connected together, more particularly in the form of a rigid unit to constitute the housing ring 14. In the as yet unconnected condition of these two ring parts, that is to say when the housing ring 14 of the sealing 13 and 13' is not yet assembled or a ring part of the housing ring 14 of the sealing ring 13 and 13" is not yet fitted, there is then an axially directed annular receiving opening, which is open towards the ring space 15 and allows axial insertion of the sealing elements 20 into the ring space 15 without substantial deformation of the sealing element 20. Therefore it is preferred to firstly manufacture the ring parts of the respective sealing ring 13 separately and then before assembly of all the ring parts of a sealing ring 13 to insert the sealing element 20, whereafter, while simultaneously closing the insertion opening, the remaining ring part or parts are fitted.

The ring part 13 and 13" consists of three ring parts 30, 31 and 32. One of these ring parts 30 constitutes the circumferential wall or ring part 17 and is designed in the form of a hollow cylindrical ring part. The two further ring parts 31 and 32 constitute the two walls or ring parts 16 and 16', which flank the sealing element 20 axially. They take the form of washers with central holes and are arranged at the two axial edge parts of the hollow cylindrical ring part 30 and preferably their radially outer circumferential edge is fixed radially internally on the ring part 30. The axial length of the housing ring 14 is hence dependent on the axial length of the ring part 30. The inwardly directed surface of the ring part 30 constitutes the floor 47 of the ring space 15, while the axially directed surfaces of the ring space 15 and therefore also the housing steps 51 and 51' are formed on the lateral ring parts 31 and 32. The radially measured depth of the widened section 52 may in this case, as in the other working embodiments of the invention, be larger than the correspondingly measured thickness of the retainer spurs 49 and 49'.

In order to provide a permanent connection of the ring parts with each other in the contact zone of two ring parts 30 and 31 and, respectively, 30 and 32 adjoining each other there is a detent connection 59. This detent connection comprises interlocking detent heads and, respectively, detent recesses, the result then being preferably a permanent detent join. As shown in FIG. 3 this working embodiment is such that the floor 47 is radially convex inwards towards the center as seen in cross section, the convex surface simultaneously constituting an axial abutment for the disk-like ring parts 31 and 32 which are snapped in from the outside.

It is an advantage if at least one of the ring parts, which cooperate together to give a detent connection, consists of synthetic resin material. For this reason in the illustrated working embodiment of FIG. 3 the two axial ring parts 31 and 32 consist of synthetic resin material, more particularly in the form of a high strength polymer. The hollow cylindrical ring part 30 consists preferably of metal.

As an advantageous alternative to the detent connection it is possible also to provide a press-fit assembly system, which facilitates assembly. Such a system is utilized in the case of the sealing ring 13 and 13' in accordance with FIG. 2, the ring parts 28 and 29 present preferably consisting of metal.

In the case of the sealing ring 13 and 13' of FIG. 2 one ring part 28 is made with a substantially L-like cross section. In it an axially extending ring part 16' and at least in part, the circumferential ring part 17 are united as a single-piece component. The second ring part 16 is constituted by the second ring part 29, which is designed in the form of a washer and is arranged adjacent to the free end, opposite to the ring part 16', of the ring part 17. As in the illustrated working embodiment of FIG. 3 the essentially washer-like ring part 29 is enclosed radially on the outside by the circumferential ring part 17, into which it is preferably press-fitted.

The depth of pressing in the ring part 29 is preferably limited by a circumferential ring step 60 of the ring part 17. It is positioned in this case adjacent to the axial center of the assembled housing ring 14. It is in this manner that the floor 47 of the ring space 15 is constituted by axially adjacent surface sections of the two ring parts 28 and 29. It is possible to have respective conical surface sections, whose parts with a large diameter are turned towards each other so that in the assembled condition the grooveed shape of the floor 47 is automatically produced.

It is also possible to conceive the housing ring 14 of the sealing ring 13 and 13' as being a structure with a U-like cross section, that adjacent to the transverse part of the letter U connecting the limbs thereof has a parting plane which starting from the ring space 15 firstly extends radially outwards and then extends axially as far as the axially outer surface of the housing ring 14.

It is an advantage furthermore if the two end parts, which flank the housing opening 18 axially, of the two ring parts 16 and 16' are tapered towards the housing opening 18. The cross section, which is surrounded by the housing ring 14, starting at the part adjacent to housing opening 18 widens towards the axially outer surface. The widened parts may be constituted by a conical oblique surface.

As a joint between two ring parts it is possible, in some cases, to have bonded, soldered or welded connections. A detent or press-fit connection is however substantially less complicated and is more suitable for robotized assembly lines.

The sealing ring (13) may also be so designed that both the housing opening (18) and also the sealing part (50) are directed radially outwards. In this case the sealing ring (13) is secured using the ring part (17) which is directed radially inwards and the sealing part (50) provides for an outward sealing action. It is more particularly in the case of such an arrangement that it is possible for the sealing ring (13) also to be used as a piston seal fixed on the piston of a piston and cylinder unit.

We claim:

1. A self-supporting annular seal unit for providing a seal between a valve housing and an axially-directable valve piston positioned in said valve housing comprising:
   an annular housing ring having an outer circumferential surface dimensioned for press-fitting within said valve housing and having an annular ring space opening radially inward;
   an annular sealing element positioned in said ring space and having a sealing lip projecting radially inward for sealingly contacting said piston; and
   wherein said housing ring is formed from at least two parts to allow loading of said sealing element into said ring space when said housing ring is unassembled, said housing ring including means for retaining said sealing element within said housing ring.

2. The seal unit according to claim 1, wherein said sealing element is retained in a radially-yielding manner.

3. The seal unit according to claim 1, wherein said sealing element includes at least one axially-extending retainer spur; and
   wherein said retaining means is an annular housing step, said housing step positioned to contact said at least one retainer spur when said sealing element moves in the radial direction.

4. The seal unit according to claim 3, wherein said sealing lip includes a sealing part that projects radially-inward to sealingly contact said piston and a neck-like thinner section extending between said at least one retainer spur and said sealing part.

5. The seal unit according to claim 1, wherein said housing step is formed by the intersection of an axially-extending widened section and a radially-extending slot-like section.

6. The seal unit according to claim 5, wherein said slot-like section is tapered in the radially-inward direction.

7. The seal unit according to claim 1, wherein said sealing element has a pair of axially-extending retainer spurs such that said sealing element has a substantially T-like cross-section; and
   wherein the radial length of said sealing lip is greater than the combined axial length of said retainer spurs.

8. The seal unit according to claim 7, wherein said ring space of said housing is partially defined by an axially-extending widened section, said widened section having a non-linear axially-extending floor, the center of said floor being positioned radially outward from the ends of said floor to accept radial deformation of said sealing element.

9. The seal unit according to claim 1, wherein said sealing lip is generally configured in the shape of a circular washer.

10. The seal unit according to claim 1, wherein said axially-extending widened section is partially defined by a pair of opposing radially-extending walls; and
    wherein said walls engage the axial edges of said retainer spurs for clamping said sealing element therebetween.

11. The seal unit according to claim 10, wherein said at least one self-supporting annular seal unit is press-fit into said valve housing.

12. The seal unit according to claim 1, wherein said housing ring is defined by a pair of axially-spaced walls having an intermediate wall extending therebetween.

13. The seal unit according to claim 12, wherein at least one of said ring parts is generally configured in the shape of a circular washer and forms at least a portion of one of said axially-spaced walls.

14. The seal unit according to claim 12, wherein at least one of said ring parts has a generally L-like cross-section.

15. The seal unit according to claim 12, wherein said housing ring is formed from three ring parts.

16. The seal unit according to claim 12, wherein said ring parts are connected by one of a press-fit or a detent connection.

17. A self-supporting annular seal unit for providing a seal between a valve housing and an axially-directable valve piston positioned in said valve housing comprising:
    an annular housing ring capable of being press-fit within said valve housing and having an annular ring space opening radially inward;

an annular sealing element positioned in said ring space and having a sealing lip projecting radially inward for sealing contacting said piston, said sealing element also having a pair of axially-extending retainer spurs which hook onto a housing step formed in said housing ring in order to permanently retain said sealing element; and wherein said housing step is formed by the intersection of an axially-extending widened section and a radially-extending slot-like section; and wherein both said sealing element and said ring space of said housing ring have a substantially T-like cross-section, the radial length of said sealing lip being greater than the combined axial length of said retainer spurs; and wherein said housing ring is formed from at least two parts to allow loading of said sealing element into said ring space when said housing ring is unassembled.

18. A spool valve comprising:

a valve housing having a piston-receiving recess therein;

an axially-directable valve piston positioned in said piston-receiving recess;

at least one self-supporting annular seal unit positioned in said piston-receiving recess for providing a seal between said valve housing and said piston; and wherein said annular seal unit comprises:

an annular housing ring having an outer circumferential surface dimensioned for press-fitting within said valve housing and having an annular ring space opening radially inward;

an annular sealing element positioned in said ring space and having a sealing lip projecting radially inward for sealingly contacting said piston; and wherein said housing ring is formed from at least two parts to allow loading of said sealing element into said ring space when said housing ring is unassembled, said housing ring including means for retaining said sealing element within said housing ring.

* * * * *